Feb. 6, 1968 G. H. FATHAUER 3,367,469

DIGITAL PRINTER WITH PLURAL SIMILAR PRINT HEADS

Filed Aug. 29, 1963 5 Sheets-Sheet 1

INVENTOR.
George H. Fathauer
BY
Pendleton, Neuman, Seibold & Williams
Att'ys

INVENTOR.
George H. Fathauer
BY
Pendleton, Neuman, Seibold & Williams
Att'ys

Feb. 6, 1968 G. H. FATHAUER 3,367,469

DIGITAL PRINTER WITH PLURAL SIMILAR PRINT HEADS

Filed Aug. 29, 1963 5 Sheets-Sheet 3

INVENTOR.
George H. Fathauer
BY
Pendleton, Neuman
Seibold & Williams
Atty's

Feb. 6, 1968 G. H. FATHAUER 3,367,469

DIGITAL PRINTER WITH PLURAL SIMILAR PRINT HEADS

Filed Aug. 29, 1963 5 Sheets-Sheet 4

INVENTOR
George H. Fathauer
BY
Pendleton, Neuman,
Seibold & Williams
Attys

DIGITAL PRINTER WITH PLURAL SIMILAR PRINT HEADS

Filed Aug. 29, 1963

INVENTOR.
George H. Fathauer
BY
Pendleton, Neuman, Seibold & Williams, Attys

United States Patent Office 3,367,469

Patented Feb. 6, 1968

3,367,469

DIGITAL PRINTER WITH PLURAL SIMILAR PRINT HEADS

George H. Fathauer, Decatur, Ill., assignor, by mesne assignments, to The Dole Valve Company, Morton Grove, Ill., a corporation of Illinois Filed Aug. 29, 1963, Ser. No. 305,353
10 Claims. (Cl. 197—1)

This invention relates to a digital printer and more specifically to a digital printer capable of printing a plurality of numerical characters or integers in successive lines on a paper tape at a very high speed.

Such printers are particularly useful as adjuncts to digital computers and data processors which are capable of making calculations at an extremely high rate of speed. In the prior art the usefulness of such computers, especially for business applications, has been limited primarily because of the fact that it has not been possible to print the results of such computations in a manner which renders such results readily intelligible to an operator except at a relatively low speed.

In some prior art systems, an attempt has been made to overcome this difficulty by providing an intermediate storage mechanism in the form of magnetic tape, etc., which can accept output information at very high speed, and then using such intermediate storage to furnish a slow speed input to one or more relatively slow speed printers while the computer performs additional calculations at its own speed. This approach, however, requires a large amount of equipment, including a plurality of printers, and a relatively expensive intermediate storage mechanism.

Other attempts have been made to increase the speed of individual printers; however, such improved printers are extremely expensive, and require a large amount of power to operate.

It is therefore an important object of the present invention to provide an inexpensive digital printer capable of printing numerical integers on a record medium at an extremely high rate of speed.

It is a further object of the present invention to provide a printing head made up of a plurality of individual type elements, each adapted to print a mark at a predetermined location within a limited area of a record medium, and a mechanism for selecting a particular combination of such individual type elements for operation, to print recognizable characters.

It is another object of the present invention to provide a printing head adapted to print recognizable characters by reproducing individual lines within such characters so as to form printed representations of such characters from predetermined combinations of such lines.

It is a further object of the present invention to provide a printer having a series of printing heads, each of such printing heads being adapted to print any of a plurality of different character representations, a platen for supporting a record medium, and means for causing the platen to move the record medium against the printing heads.

Further and additional objects of the invention will become manifest from a consideration of this specification, the accompanying drawings and the appended claims.

In one embodiment of the present invention, a digital printer is provided with a number of printing heads in aligned spaced relation and arranged in transverse relationship to a paper record tape, upon which tape each of the printing heads is adapted to print. The record tape is supported by a platen which is caused to move during each cycle of operation to force the record tape against the printing heads and to advance the tape forward by a distance corresponding to one line of printing.

Each of the printing heads includes a rigid framework removably attached to the frame of the printer, and a number of type elements are slidably disposed within such framework. The type elements are capable of assuming an extended position or a retracted position, as determined by the position of a control arm provided for each type element. The position of each of the control arms is determined by an individual electromagnet mechanism which is responsive to input signals to cause a predetermined combination of type elements to be moved to their extended position.

When the platen raises the record tape against the type elements which have been extended toward the platen, those type elements are caused to mark their respective areas of the printing field on the tape, while the other type elements will not mark the tape. The result is that a character is formed by the juxtaposition of two or more printed lines, each of the lines being individually printed by a different type element.

At the conclusion of the printing operation, the position of each of the control arms is reset, preparatory to a further cycle of operation in which a different character may be printed.

The mode of operation of apparatus embodying the present invention does not involve the selective acceleration of a relatively large mass in order to print. Nor is it required to accelerate a large mass in order to select the character or portions of characters to be printed. Character selection is effected merely by moving relatively small control arms to lock individual type elements against movement, which is accomplished very rapidly.

Consequently, the present invention is capable of performing printing at exceptionally high rates of speed without the necessity of large sources of mechanical power in order to drive the moving parts of the apparatus.

For a more complete understanding of the invention reference will now be made to the accompanying drawings, in which.

Figure 14:
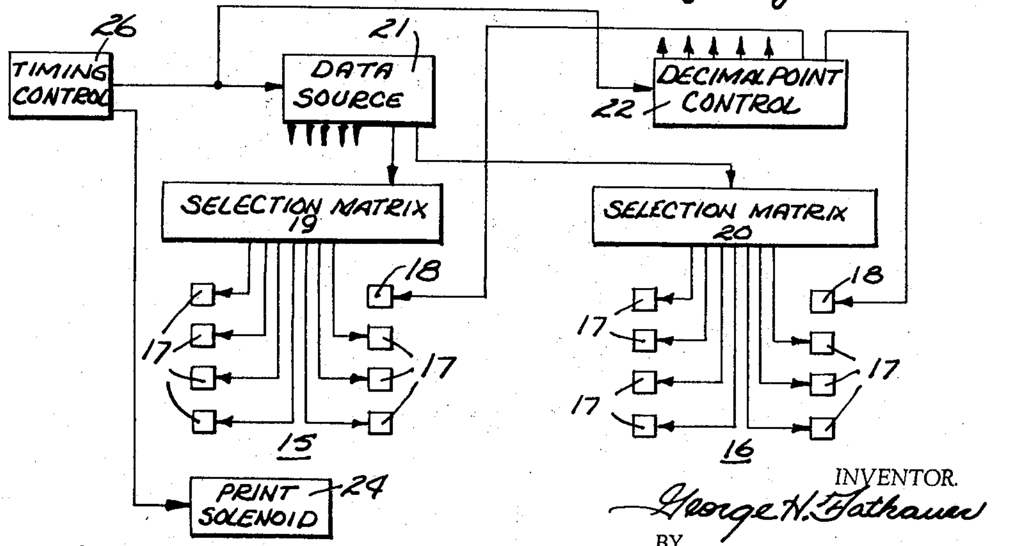
FIG. 14 is a functional block diagram of apparatus embodying the present invention.

Referring first to FIG. 14, there is shown in functional block form, two separate printing heads indicated generally as 15 and 16, each of which has seven symbol type elements 17, and a single decimal point type element 18. Each of the printing heads 15 and 16 is controlled by a selection matrix 19 and 20, respectively, which serves to enable one or more of the type elements 17 for printing, in accordance with signals received from a data source 21, to which both of the selection matrices 19 and 20 are connected. A separate decimal point control unit 22 is connected directly to the decimal point type elements 18.

The function of the selection matrices 19 and 20 is to cause individual combinations of type elements to be enabled for printing on a paper tape or other record medium. When the type elements are thus enabled, a print solenoid 24 is energized to effect the actual printing of the type elements upon the record medium. The timing of the print solenoid 24 and the data source 21, is controlled by a timing control 26, which first applies a signal to the data source 21 and the decimal point control 22 in order to enable (or set up) selected type elements in each of the printing heads 15 and 16, and at a later time provides a signal to the print solenoid 24 to effect printing of the selected type elements on the record medium.

Although FIG. 14 illustrates only a pair of printing heads 15 and 16, it will be appreciated that any number of such printing heads may be connected to an appropriate data source 21 and an appropriate decimal point control 22 in the same manner. Both the data source 21 and the decimal point control 22 are illustrated with five additional unconnected terminals which may be applied to five additional printing heads.

Figure 1:
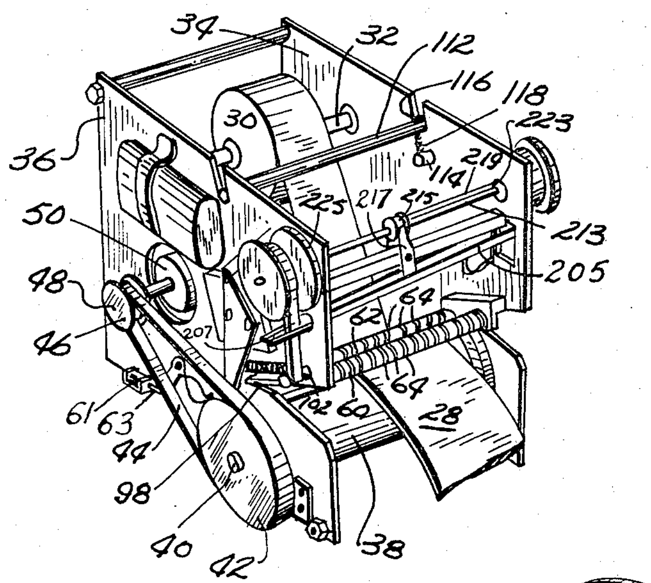
FIG. 1 is a perspective view of a digital printer embodying the present invention.

Referring now to FIG. 1, there is illustrated a perspective view of the front of a digital printer embodying the present invention which is adapted to print numerical characters, or integers, on a paper record tape 28 which is stored in a paper roll 30, rotatably mounted on a shaft 32 journaled between two side walls 34 and 36 of the frame of the printer. The paper tape 28 passes over a platen 38 which is connected with a shaft 40 by means to be described. A pulley 42 is rotatably mounted on the shaft 40 and is connected by a belt 44 to another pulley 46 secured to the shaft 48 which is driven by a motor 50. The motor 50 is preferably continuously operated and serves to continuously rotate the pulley 46, and the pulley 42 and shaft 40 through the belt 44.

Figure 2:
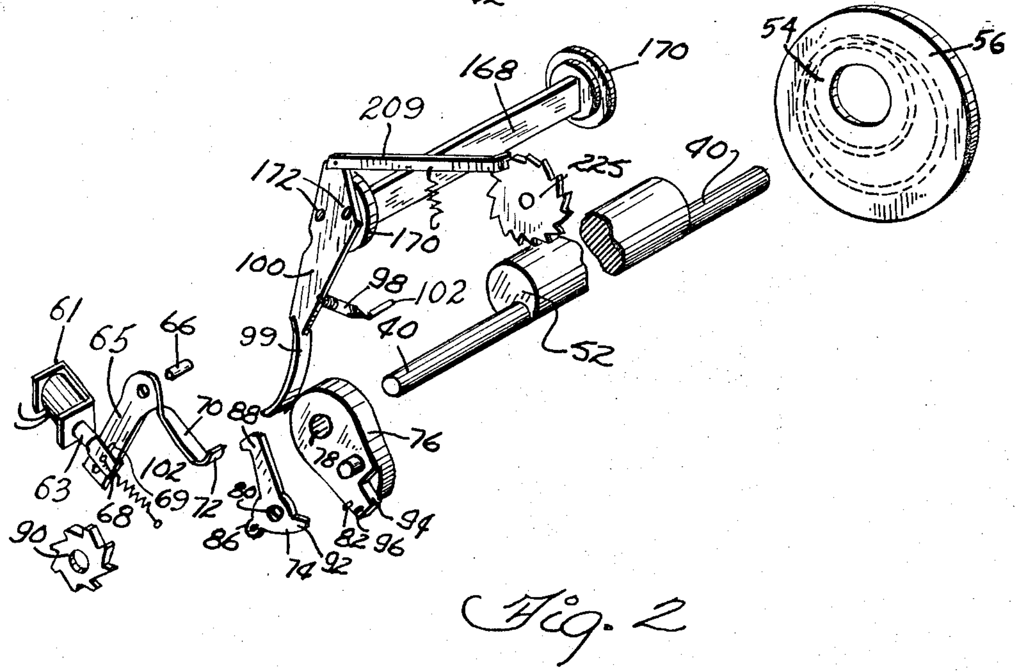
FIG. 2 is an exploded view of apparatus associated with the drive mechanism of the apparatus of FIG. 1.

Referring now to FIG. 2, the shaft 40 has an eccentrically mounted cylindrical platen carrier 52 secured thereto. The axes of the shaft 40 and the cylindrical platen carrier 52 are parallel to permit the platen carrier 52 to swing in a circular arc around the axis of the shaft 40 during each revolution of the shaft 40. The platen 38 (FIG. 1) is rotatably mounted on the platen carrier 52 so that it also is moved in a circular arc with respect to the axis of the shaft 40, during each rotation of the shaft 40.

A gear 54 is connected to the right hand end of the platen 38 and is concentric therewith. The gear 54 meshes with a ring gear 56 which is fixed to the side wall 34 of the printer and is disposed in concentric arrangement with the shaft 40.

As shaft 40 is rotated, the gear 54 rolls around the interior periphery of its meshing ring gear 56, as the platen carrier 52 is swung around the axis of the shaft 40. Being of smaller diameter, the gear 54 is provided with a lesser number of teeth than the number of meshing teeth in the gear 56, so that as the gear 54 rolls around the surface of the gear 56 and returns to its initial starting position, the platen 38 is rotated through an angle corresponding to the difference in the number of teeth provided in the two respective gears 54 and 56. This serves to cause the platen to be rotated, with respect to its own axis, through an angle corresponding to one line space, during each rotation of the shaft 40.

When the platen carrier 52 moves in an upward direction as it swings around the axis of the shaft 40, it causes the platen 38 to become engaged with printing heads the lower ends of which are supported between a pair of printing head carrier rods 60 and 62. The rods 60 and 62 are provided with a groove 64 for each printing head, which grooves are of a width just sufficient to receive a printing head and hold it securely in place.

Figure 5:
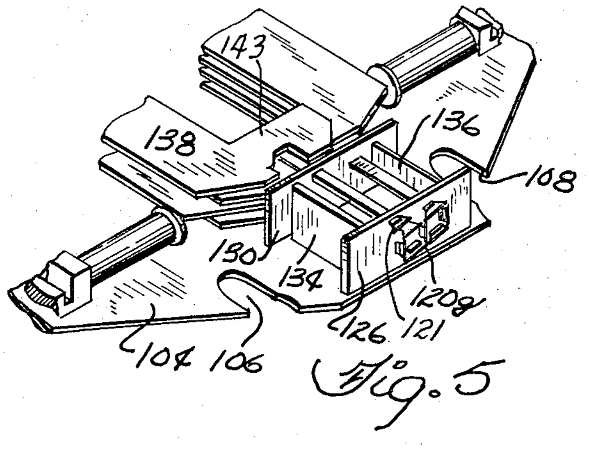
FIG. 5 is a partial perspective view of the printing head of FIG. 4.
Figure 4:
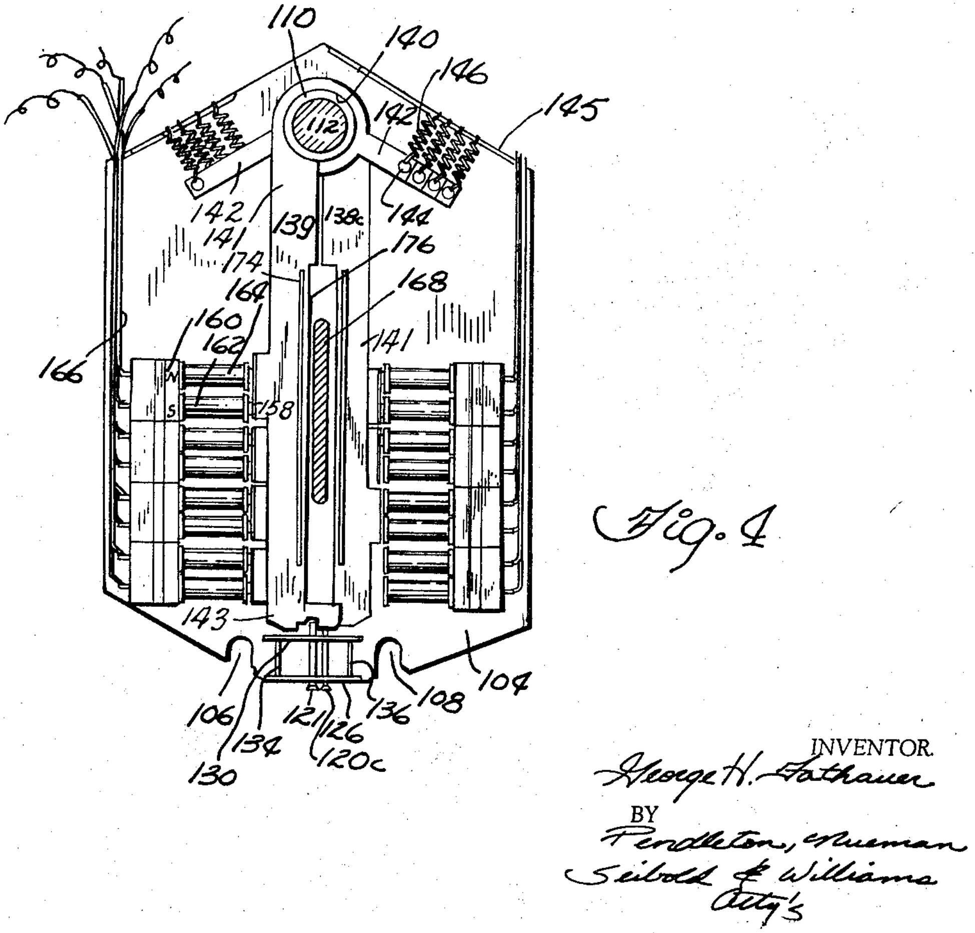
FIG. 4 is a plan view of one of the printing heads of the apparatus of FIG. 1.

Although FIG. 1 is illustrated, for simplicity, without and printing head in place, the printing head illustrated in FIGS. 4 and 5 is adapted to fit in each aligned pair of grooves 64 in the rods 60 and 62.

Referring again to FIG. 2, it will be seen that the platen carrier 52 is shown in its uppermost position, while the gear 54 is also shown in its uppermost position. In this position the platen 38, which surrounds the platen carrier 52, is adjacent the printing heads, which are operative to mark the paper tape 28 borne by the platen when appropriately actuated.

The shaft 40 which may be referred to as a printing shaft is rotated for one revolution in response to the energization of a print solenoid 61, which is mounted on the side wall 36 of the apparatus illustrated in FIG. 1. Solenoid 61 is provided with a plunger 63 connected to a bell crank 65 rotatably mounted on a pin 66 which is secured to the side wall 36 of the printer. The bell crank 65 is pivoted to the plunger 63 of the print solenoid by a pin 68 extending through a slot 69. The bell crank 65 is provided with a finger 70 having an upturned end 72 for engaging a pawl 74 and a cam 76. The manner in which the finger 70 is associated with the pawl 74 and the cam 76 is shown more clearly in FIG. 3. The cam 76 is fixed to the left end (as shown in FIG. 2) of the shaft 40 and rotates therewith. A stud 78 extends outwardly (as seen in FIG. 2) from the cam 76, through an aperture 80 of the pawl 74, and the pawl 74 is rotatably supported on the stud 78.

Figures 3, 10, 11:
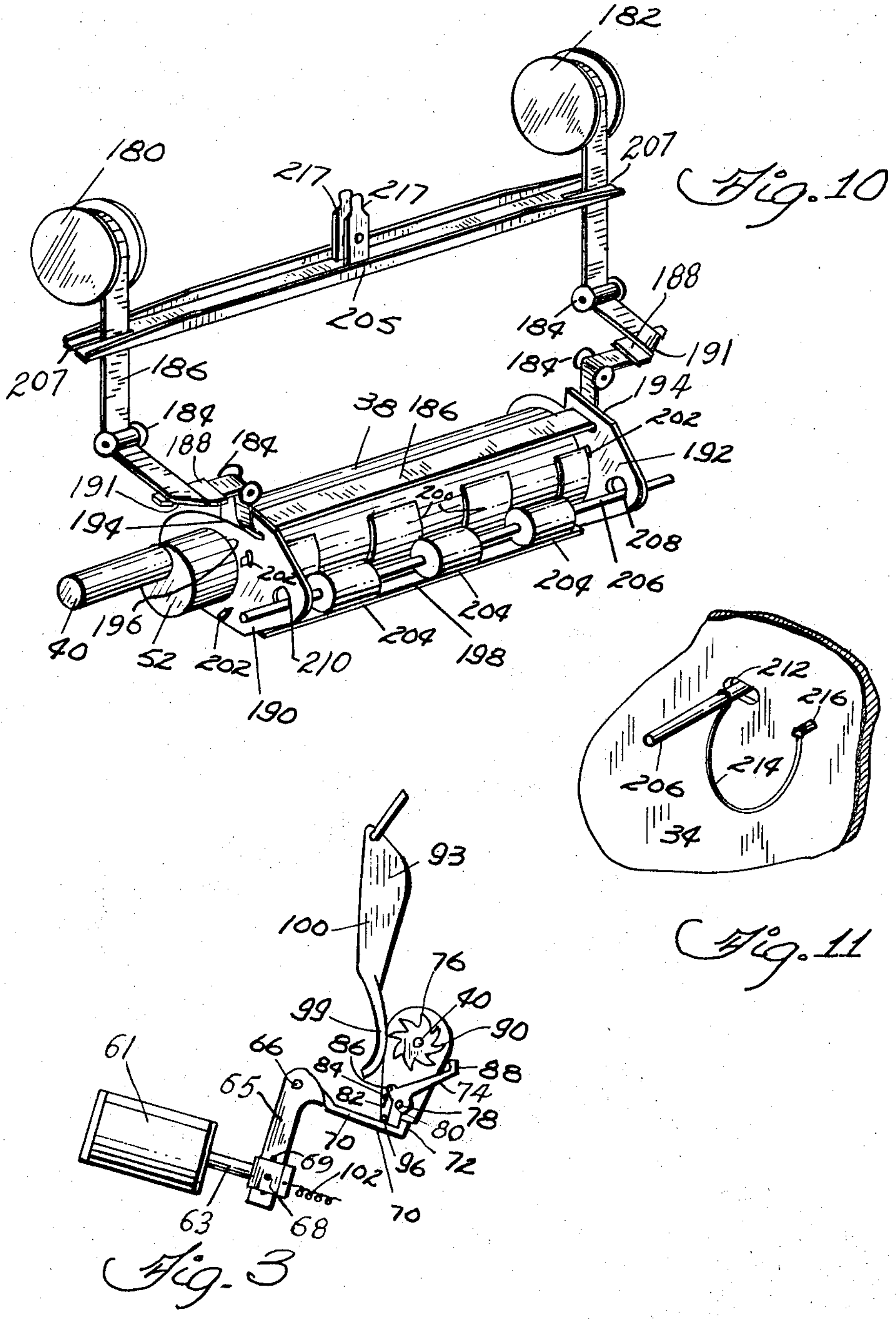
FIG. 3 is a side view of a portion of the drive mechanism of FIG. 2.
FIG. 10 is a view of the platen and associated structure of the apparatus of FIG. 1, looking from the rear of the machine.
FIG. 11 is a partial perspective view of the side of the apparatus of FIG. 1, illustrating the relation of the paper roller shaft of the side wall of the frame.

A pin 82 also extends outwardly from the cam 76 (as seen in FIG. 2) and a spring 84 is connected between the pin 82 and an arm 86 of the pawl 74. The spring 84 tends to rotate the pawl 74 in a counterclockwise direction, so that the nose 88 of the pawl 74 engages with one of the teeth of a ratchet 90 which is fixed to the pulley 42, shown in FIG. 1, and continuously rotates with the pulley 42 freely on the shaft 40. When the clutch mechanism is in its initial position, however, which is shown in FIG. 3, the upturned end 72 of the finger 70 is in position against the projection 92 on the pawl 74 and a radial surface 94 (FIG. 2) which is provided on the cam 76. In this position, the pawl 74 is held in its clockwise position, with respect to the cam 76, thereby lifting its nose 88 out of engagement with the ratchet wheel 90. The clockwise rotation of the pawl 74 is limited by a pin 96 which abuts against the projection 92 of the pawl 74. The cam 76 is maintained in abutment with the upturned end 72 of the finger 70 by the force of a spring 98 which holds the shoe 99 of a cam follower lever 100 against the cam 76. The spring 98 is connected between the lever 100 and a pin 102 extending from the wall 36 of the printer.

It will be seen, with reference to FIG. 3 that when the printing solenoid 61 is engaged, its plunger 63 is withdrawn to cause the bell crank 65 to pivot in a clockwise direction. This movement withdraws the upturned end 72 of the finger 70 from engagement with the cam 76 and the pawl 72. The spring 84 then rotates the pawl 74 counterclockwise until the nose 88 of the pawl 74 is in engagement with one of the teeth of the constantly rotating ratchet wheel 90. When the pawl is so engaged with a ratchet tooth, the rotation of the ratchet weel 90 causes counterclockwise rotation of the pawl 74 and cam 76, together with the shaft 40 and the platen carrier 52. When a full revolution of the shaft 40 has been completed, during which the cam follower 100 has been rotated to a clockwise position and then later returned to its normal condition, the force of the spring 98 acts via the shoe 99 of the cam follower 100 to return the cam 76 to the position illustrated in FIG. 3, so that the radial surface 94 of the cam 76 and the finger 92 of the pawl 74 are both engaged with the upturned end 72 of the finger 70 of the bell crank 65, which has been returned to its counterclockwise position by the spring 102 after the deenergization of the solenoid 61. When the finger 92 of the pawl 74 engages the finger 70, the nose 88 of the pawl 74 is withdrawn from engagement with the ratchet wheel 90 and the clutch remains disengaged until a subsequent actuation of the solenoid 61.

One of the printing heads of the printer is illustrated in FIGS. 4 and 5, which show the printing head in plan view and in perspective, respectively. The printing head includes a plate 104 which is provided with notches 106 and 108 at one end thereof, which notches cooperate with a pair of the grooves 64 in the rods 60 and 62 illustrated in FIG. 1. The notches 106 and 108 are of the proper size to receive the reduced dimension of the rods 60 and 62 within an aligned pair of the grooves 64, so that the printing head is held securely in fixed position with respect to the side walls 34 and 36. The other end of the plate 104 is provided with an aperture in which is mounted a bearing 110, which receives a rod 112 extending between the side walls 34 and 36. As shown in FIG. 1, the rod 112 is secured to a stud 114 fixed to the side wall 34 of the printer by means of a bolt 116, which slips through a bore in the rod 112 and is threadably received within a bore in the stud 114. A spring 118 is positioned around the bolt 116 between the rod 112 and the stud 114 so as to urge the rod 112 away from the platen 38 until it is lowered by tightening the bolt 116, after the printing heads have been aligned with their respective grooves 64 in the rods 60 and 62. A similar stud, bolt and spring mechanism is provided on the other end of the rod 112 and the side wall 36.

Figure 8:
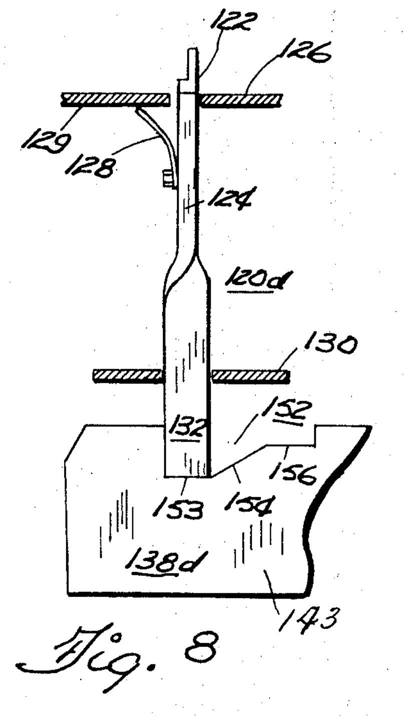
FIG. 8 is a side view of a type element associated with the printing head of FIGS. 4 and 5.
Figure 9:
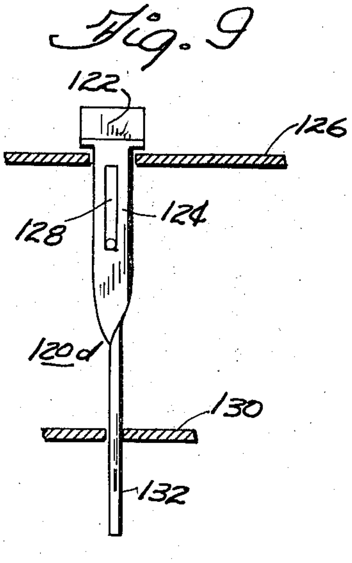
FIG. 9 is a plan view of the type element of FIG. 8.

Between the notches 106 and 108 of the plate 104 is mounted a group of type elements 120*a*–120*g* and 121, of which 120*d* is illustrated in more detail in FIGS. 8 and 9. The type elements 120 and 121 are arranged in such a fashion that the printing on the record tape 28 by each of the type elements 120 forms a line which is part of one or more numerical characters or integers, and the printing by the type element 121 forms a decimal point. Each of the type elements 120 and 121 is selectively operated individually so that any desired combination of the type elements 120 and/or 121 may be caused to print upon the record tape 28 when the platen 38 is raised to its printing position.

Figure 6:
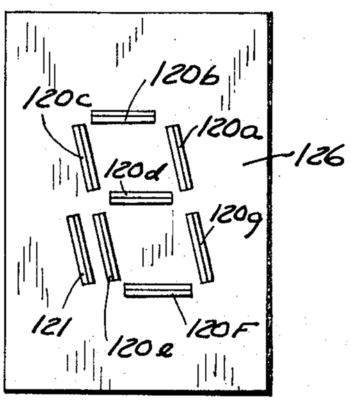
FIG. 6 is a front view of the printing head of FIGS. 4 and 5.

Each of the type elements 120 and 121 comprises a T-shaped member provided with a hammer 122, and a body portion 124 of reduced dimension. The body 124 of each of the type elements 120 and 121 has a rectangular cross section and passes through an aperture of similar cross section in an aligning plate 126. A plan view of the aligning plate 126 is shown in FIG. 6, which also illustrates the arrangement of the various type elements.

In FIGS. 8 and 9, side and plan views of one of the type elements 120*d* are illustrated, and the other type elements have similar constructions. A spring 128 is disposed in a recess 128 coined into the surface of the type element 120*d*, and one end of the spring 127 is welded to the type element. The spring 128 cooperates with a surface 129 of the aligning plate 126 to maintain the type element 120*d* in registry with appropriate apertures in the aligning plates 126 and 130, and prevents it from falling out of that position. The spring 128 permits the type elements 120 to be assembled merely by inserting them into their apertures in the aligning plates 126 and 130, since the spring 128, when depressed into the recess 127, is flush with the surface of the type element.

Figure 7:
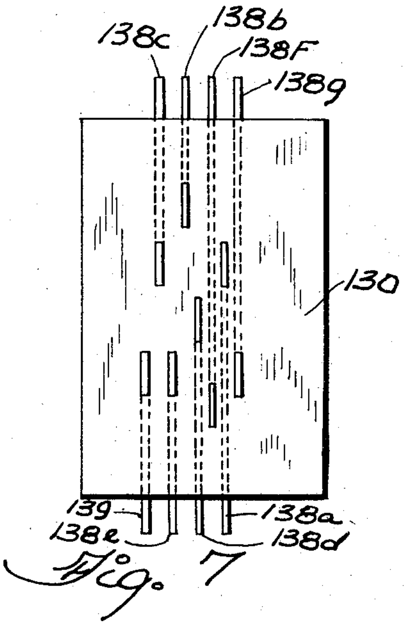
FIG. 7 is a plan view of a guide plate associated with the printing head of FIGS. 4 and 5.

A second aligning plate 130 is positioned parallel to the aligning plate 126, and spaced therefrom. A plan view of the aligning plate 130 is shown in FIG. 7. Apertures are provided in the aligning plate 130 which are also of a rectangular cross section, and each accommodates the rear end 132 of the body 124 of each of the type elements 120 and 121.

Between the aligning plates 126 and 130 the body 124 of each type element 120 is twisted as required to correctly orient the rear end 132 of each body member 124 with its respective aperture in the aligning plate 130. It is apparent that some of the type elements such as 120*d* are twisted approximately 90°, as shown in FIGS. 8 and 9, while the remainder of the type elements 120 and 121 are twisted through a smaller angle in order to simultaneously register with the apertures in both of the two aligning plates 126 and 130.

The two aligning plates 126 and 130 are spaced from each other by spacer plates 134 and 136 (FIG. 4), and the assembly comprising the two aligning plates 126 and 130 and the two spacer plates 134 and 136 are fixed to the plate 104 by being welded thereto or the like.

The rear ends 132 of the type elements 120 project beyond the aligning plate 130, and cooperate with the ends of individual ones of control arms 138*a*–138*g* and 139, which are illustrated in FIGS. 4 and 5. Seven control arms 138 are provided, one for each of the type elements 120, and each has a configuration similar to that illustrated in FIG. 4. An additional control arm 139 is provided for the decimal point type element 121. Each of the control arms 138 and 139 is formed from flat metal stock, for example by punching, and is provided with an aperture 140 surrounding the bearing 110, about which each of the control arms 138 and 139 is pivotable. Each control arm has a body 141, interposer 143, and a projection 142. The projection 142 extends radially with respect to the aperture 140 and is provided with aperture 144. A spring 146 is connected between the aperture 144 and a corresponding aperture in an upturned flange 145 at the edge of the plate 104. The body 141 of each of the control arms 138 and 139 extends toward the aligning plate 130, and the interposer 143 extends transversely from the body 141 at the end thereof. Each interposer 143 is provided with a notch 152 having a deep portion 153, a shallow portion 156, and an intermediate sloping portion 154. Each notch 152 cooperates with the rear end 132 of one of the type elements 120.

When the control arm 138*d* is in the position shown in FIG. 8, the rear end 132 of the type element 120*d* is aligned with the deep portion 153 of the notch 152, and therefore the type element 120 is free to assume the retracted position illustrated in FIGS. 8 and 9. When, however, the control arm 138*d* is moved counterclockwise, under the influence of the spring 146, whereby the transverse leg 143 moves to the left in FIG. 8, the rear end 132 of the type element 120*d* rides up the inclined surface 154 (FIG. 8) of the notch 152 to cooperate with the shallow end 156 of the notch 152, thereby restraining the hammer 122 in a position outwardly from the aligning plate 126. This interference by the interposer 143 produces the printing force when the platen is moved.

The control arm 139 is normally held in its non-interfering position by a magnet assembly (FIG. 4) which cooperates with a projection 158 of the control arm 139. The projection 158 has a flange bent at a right angle to the plane of the control arm 139 and serves as an armature for a permanent magnet 160, having north and south poles as indicated in FIG. 4. A pair of pole pieces of material having a high magnetic permeability extend from the magnet 160, and are surrounded by windings 162 and 164, respectively. The pole pieces cooperate with the permanent magnet 160 and with the projection 158 to normally hold the control arm 139 in its most clockwise position.

The windings 162 and 164 are wound in aiding relationship and form an electromagnet, operable when energized via wires 166 to counteract the effect of the permanent magnet 160 by producing magnetic flux flowing in the reverse direction to that generated by the permanent magnet 160. The magnetic flux flowing through the flange of the projection 158 is thereby reduced, to enable the projection 158 of the control arm 139 to be released from engagement with the pole pieces 162 and 164, and to permit the spring 146 to move the control arm 139 to its counterclockwise position, thus locking its associated type element 121 outwardly. Once having been thus released by the action of the electromagnet formed by windings 162 and 164, the control arm 139 remains in its interfering position with its interposer 143 blocking movement of its type element 121, until reset by operation of a reset lever 168, which is described hereinafter. The magnetic flux produced by the permanent magnet 160 does not generate sufficient force to cause the control arm 139 to move to its non-interfering position, but when the control arm 139 is moved to the retracted position by operation of the reset lever 168, the permanent magnet 160 holds it in that position, against the action of the spring 146.

The reset lever 168 is connected to the cam follower lever 100 (FIG. 2) and is adapted to pivot, when the cam follower lever 100 is pivoted during each revolution of the cam 76. The ends of the reset lever 168 are supported in slots provided in each of two nylon bearings 170, which bearings are provided with circular projections pivotally journaled within circular apertures in the side walls 34 and 36. The reset lever 168 is pivotally mounted about its longitudinal axis and actuated by the cam follower lever 100 when the latter is pivoted by the cam 76. The cam follower lever 100 is fixed to one of the nylon bearings 170 by screws 172, so that the pivoting motion of the cam follower lever 100 is imparted to the reset lever 168. When the reset lever 168 is pivoted with respect to its longitudinal axis, the control arm 139 is returned to its non-interfering position where it is held by the action of the permanent magnet 160.

The control arm 139 is provided with a slot 174 (FIG. 4) extending along the edge 176 of the arm 139 opposite from the side on which the projection 158 is located. The purpose of the slot 174 is to render the edge 176 of the control arm 139 resilient. This allows for a variation in the amount of pivoting of the reset lever 168, without damaging the control arm 139, and tends to equalize the reset pressure on each control arm 138 and 139.

Although only the control arm 139 has been specifically described, a similar control arm 138*a*–138*g* is provided for each of the type elements 120, except that the projections 158 which cooperate with individual magnet assemblies are located at different positions along the control arms to allow for the compact arrangement of those magnet assemblies and the notch configuration and spring arm 142 are appropriately modified. All of the control arms 138 and 139 are arranged in two groups of four each, one group lying on either side of the reset lever 168. The arms in each group are stacked, as illustrated in FIGS. 5 and 7, above and substantially parallel to the plane of the plate 104. The positions of the notches 152 are, of course, different for different control arms, and are aligned with the rear end 132 of the respective type elements 120. Of course if other than arabic numerals were employed or a different type style were desired, the location of the notches 152 would be modified accordingly.

Any of the control arms may be selectively moved to lock its respective type element 120 to effect a printing operation in which that type element marks the record tape. The action of the reset lever 168, by pivoting about its longitudinal axis, operates simultaneously to reset all of the control arms. The present of the slot 174 in the control arms permits the pivoting of the reset member 168 to reset all of the control arms without regard for variations in thickness or position of the different control arms.

Referring now to FIG. 10, there is illustrated a view of the platen and some of its associated apparatus from the rear of the machine. Ribbon storage reels 180 and 182 are rotatably mounted on the side walls 34 and 36 respectively, together with a plurality of rollers 184, which guide the ribbon 186 along a path between the two reels 180 and 182. On each side of the platen a right angle turn of the ribbon is necessary which is effected by plate 188 having an edge 191 disposed at an angle of 45° with respect to the required direction of the ribbon entering and leaving such plate. The ribbon is also supported by a pair of ribbon guides 190 and 192, one of which is located on each side of the platen, and each of which is provided with a slot 194, through which the ribbon 186 passes. Between the slots 194, the ribbon passes over the surface of the platen 38 and is held at a substantially constant distance away from the surface of the platen 38. Each of the ribbon guides 190 and 192 is pivotally mounted on the platen carrier 52 by way of an aperture 196, so that the ribbon guides 190 and 192 are free to pivot about the axis of the platen 38 while the platen carrier 52 swings around the axis of the shaft 40.

A paper guide 198, having a plurality of curved finger portions 200, is disposed adjacent the surface of the platen 38 and is mounted on said ribbon guides 190 and 192 by tabs 202 protruding through an aperture in each of these ribbon guides. A plurality of paper rollers 204 is mounted in spaced relation on a shaft 206 which passes through a pair of apertures 208 and in each of the ribbon guides 192 and 194, respectively, and is journaled in a pair of slots in the side walls 34 and 36, one of which is illustrated in FIG. 11. The paper rollers 204 cooperate with portions of the platen 38 between the finger portions 200 of the paper guide 198, to press the record tape against the surface of the platen. The shaft 206 also passes through a pair of slots 212 (FIG. 11) in the side walls 34 and 36 of the frame. Each of the slots 212 is an elongated slot and is aligned generally in a radial direction with respect to the axis of the shaft 40. A spring 214 cooperates with the outwardly extending portion of the shaft 206 beyond the side wall 34 and a stud 216 secured to the side wall 34, to maintain the rollers 204 in engagement with the platen 38. A similar stud and spring (not shown) are associated with the other side wall 36.

A bar 205, having a slot 207 at each end thereof, is pivotally supported on the frame of the printer (see FIG. 1) and is engageable with rivets positioned on the ink ribbon near the ends thereof, to operate a ribbon reversing mechanism. The power for operating the mechanism is derived from the cam follower 100 (FIG. 2) which has a pawl 209 pivotally connected thereto, engaging a ratchet wheel 225 fixed to a ribbon drive shaft 213 (FIG. 1). Only one of the reels 180 or 182 is connected to the drive shaft 213 for rotation therewith, in dependence upon the angular position of the bar 205, by a slidable collar 215, a pair of arms 217 engageable with the collar secured to the bar 205, and a pair of pins 219 attached to the collar 215 and slidably mounted respectively in a pair of bushings 223, fixed to the shaft 213, one of which is shown in FIG. 1. Each of the pins 219 is adapted to engage a recess in one of the reels 180 and 182, thereby to lock its respective bushing 223 to the shaft 213 for rotation therewith, when the collar 215 slides in one direction or the other, in response to pivoting of the bar 205.

Figure 13:
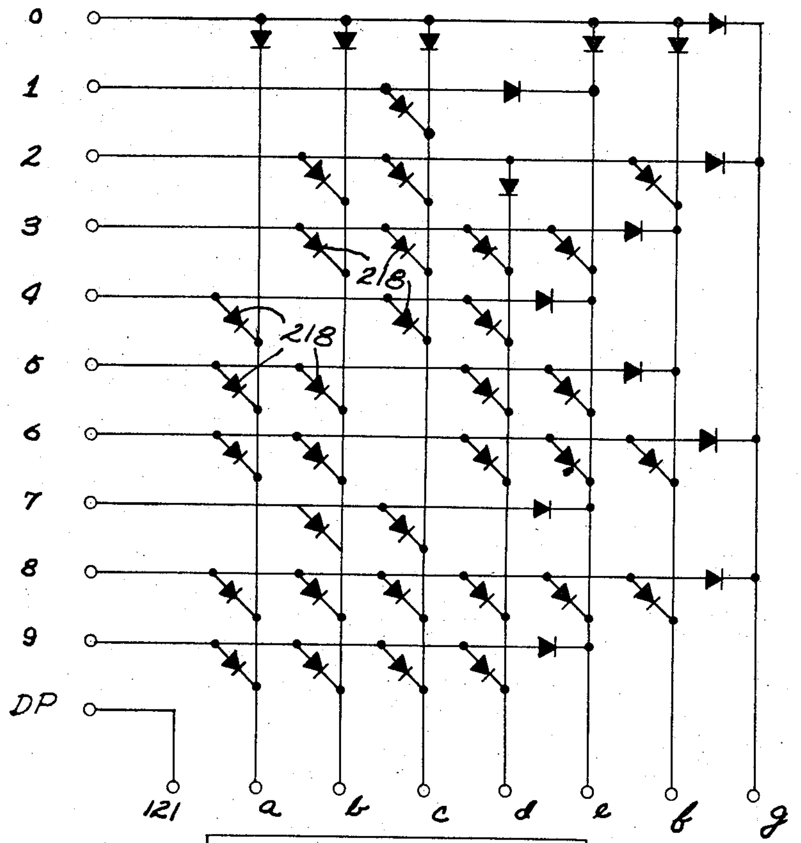
FIG. 13 is a schematic circuit diagram of a selection matrix associated with the present invention.

Referring now to FIG. 13, there is illustrated a matrix whereby input signals, corresponding to numerical integers, are transformed into signals indicative of the seven possible line segments for making up one of the integers.

The input terminals are numbered 0 through 9, corresponding to an integer selected for printing, with a decimal point input indicated at DP. The decimal point output is indicated at 121 and the type element outputs are indicated as "*a*" through "*g*," each of which is connected to its associated electromagnet for controlling the movement of the control arms 133*a* through 133*g*, respectively.

Figure 12:
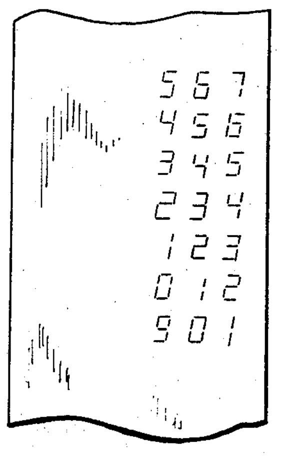
FIG. 12 is an illustration of a record type which has been printed by apparatus embodying the present invention.

As an example of the operation of the matrix illustrated in FIG. 13, consider that the terminal "5" is energized in order to set up the type elements corresponding to "5" for printing by applying a positive pulse thereto. The input pulse is connected through the diodes 218 to output terminals *a*, *b*, *d*, *e*, and *f*, which are connected directly to the electromagnets associated with the control arms 133 of the type elements illustrated in FIG. 6 as 120*a*, 120*b*, 120*d*, 120*e*, and 120*f*. It is apparent that such control arms are actuated simultaneously to lock their respective type elements to print a "5" in line-section form as illustrated on the record tape shown in FIG. 12. Pulses may be applied to other inputs of the matrix to set up other combinations of type elements for the reproduction of other characters, the printed representations of which are shown in FIG. 12. It will be appreciated that although the character representations of FIG. 12 include some spaces or gaps, the characters are directly readable and readily intelligible. If required, the gaps could be minimized or eliminated through more precise design and manufacture. In the illustration the gaps are actually exaggerated for clarity.

As illustrated in the block diagram of FIG. 14, a separate selection matrix similar to the one illustrated in FIG. 13 is required for each of the printing heads of the printer. The type elements of each printing head are set up in the manner described above, and printing on the record tape is performed by energizing the print solenoid 60 to initiate a revolution of the drive mechanism illustrated in FIG. 2. Near the end of a revolution of the drive mechanism, the reset lever 168 resets all of the control arms, preparatory to another cycle of operation in which the selection matrices 16 and 18 are set up, etc. Each cycle of operation produces one printed line of as many characters as there are printing heads.

Without further elaboration, the foregoing will so fully explain the character of my invention that others may, by applying current knowledge, readily adapt the same for use under varying conditions of service while retaining certain features which may properly be said to constitute the essential items of novelty involved, which items are intended to be defined and secured to me by the following claims.

I claim:

1. In a printer having a frame, a plurality of printing heads in fixed relation to said frame, each of said heads adapted to print a selected character, and a platen movable in a fixed path with respect to said frame and said heads, the combination comprising a plurality of printing heads, each of said heads having a planar frame member and a plurality of type elements mounted in slidable relation to said frame member, each of said frame members being mounted in parallel relation, said frame members being spaced apart by a distance approximately equal to the width of one of said characters, means for normally positioning corresponding parts of each of said type elements substantially in a plane spaced from and parallel to the surface of said platen, and a plurality of interposer levers selectively movable from a first position to a second position for selectively blocking any of said printing elements from sliding out of its normal position with respect to its frame when its interposer is in its second position.

2. Apparatus according to claim 1 including a plurality of rods secured to said frame in parallel relationship with each other, each of said rods having a plurality of grooves, each of said grooves being aligned in a plane with corresponding grooves in the others of said rods, and each of said frame members having a plurality of notches adapted to receive the aligned grooves in each of said rods, whereby said printing heads are removably secured in fixed relation to said frame.

3. Apparatus according to claim 1, wherein said interposer levers are generally planar in form and are mounted in parallel relation to said frame planes, each of said interposer levers comprising a relatively flat member adjacent one of said type elements, said interposer levers being stacked in a plurality of stacks in a direction normal to said frame planes.

4. Apparatus according to claim 3, wherein each of said interposer member has a notch with a relatively deep portion at one end and a relatively shallow portion at the other end, each of said type elements having a portion in engagement with said notch, and means for normally causing each interposer lever to assume a position where the deep portion of said notch is adjacent said type element, said control means being operative to move said interposer lever relative to said type element to a position where the shallow portion of said notch is adjacent said type element, whereby said type element is blocked from moving in a direction toward said interposer lever.

5. Apparatus according to claim 3, wherein said interposer members are normally positioned in unblocking condition and selectively moved to blocking position, and including a lever bearing against said interposer members in a direction parallel to the planes of said interposer members for resetting said interposers to their normal position, each of said interposers having a resilient connection between said interposer lever and said lever.

6. In a printer, the combination comprising a cyclical operable drive means, a drive ratchet, means for causing said ratchet to rotate continuously, a printing shaft for effecting a printing operation during each revolution thereof, a cam secured to said shaft, a pawl mounted on said cam, means urging said pawl into engagement with said drive ratchet, latch means normally holding said pawl out of engagement with said ratchet, said latch means comprising a finger adapted for engagement with said pawl and with a notch in the surface of said cam, means urging said cam into engagement with said finger whereby said pawl is out of engagement with said ratchet, and release means responsive to an electrical signal to cause said latch means to release said pawl for engagement with said ratchet to cause said printing shaft to be rotated with said ratchet to effect a cycle of operation.

7. Apparatus according to claim 6, including a bell crank, said finger being secured to said bell crank, and electromagnetic means for rotating said bell crank to remove said finger from engagement with said cam and said pawl.

8. In printing apparatus having a frame, a platen and a platen carrier for supporting said platen for movement relative to said frame between a printing position and a non-printing position, a ribbon guide comprising a pair of guide members, each of said guide members being rotatably mounted on said support means, each of said guide members having a slot for receiving an ink ribbon, said slots being arranged to hold said ribbon spaced from the surface of the platen and parallel thereto when said platen carrier is in either said printing position or in said non-printing position.

9. Apparatus according to claim 8, wherein each of said guide members is provided with an aperture therein, and including a shaft mounted in said apertures, a plurality of guide rollers mounted on said shaft, and resilient means interconnecting said shaft with same frame to urge said guide rollers toward said platen.

10. In a printer, the combination comprising a frame, a cyclical operable drive means, a single revolution clutch connected with said drive means, a printing shaft connected with said clutch, a platen, said platen being rotatably mounted on said printing shaft in eccentricity therewith, a drive gear secured to said platen and concentric therewith, a ring gear supported in fixed relation concentric with said shaft, said ring gear adapted to mesh with said drive gear, said ring gear having a larger number of teeth than said drive gear, means for rotating said shaft whereby said platen is swung in a circular arc about the longitudinal axis of said shaft, and rotated relative to its own axis by a distance equivalent to the difference between the number of teeth of said drive gear and of said ring gear, during a single revolution of said shaft, a ribbon guide comprising a pair of guide members, each of said guide members being rotatably mounted on said printing shaft for movement with said platen, each of said guide members having a slot for receiving an ink ribbon, said slots being arranged to hold said ribbon spaced from the surface of the platen and parallel thereto, a plurality of type elements each adapted to print an individual line of a character on a record medium borne by said platen, mounted on said frame in slidable relationship with said frame, control means, a plurality of interposers, each of said interposer members being associated with an individual one of said type elements, said interposers being responsive to said control means to selectively assume an activated condition, each of said type elements having a portion adapted for engagement with said ribbon and with said record medium, said portion being conditioned for such engagement when its interposer is in its activated condition, but being conditioned to avoid positive engagement when its interposer is in its normal condition, and a selectively operable lever bearing against said interposers to urge them toward their normal positions, each of said interposers having a resilient connection between said interposer and said lever.

References Cited

UNITED STATES PATENTS

| | | | |
|---|---|---|---|
| 476,941 | 6/1892 | Brooks | 197—51 |
| 2,486,985 | 11/1949 | Ruderfer | 197—1 XR |
| 2,715,360 | 8/1955 | Brown | 197—1 XR |
| 2,787,210 | 4/1957 | Shepard. | |
| 2,858,536 | 10/1958 | Johnston. | |
| 2,919,171 | 12/1959 | Epstein et al. | |
| 2,976,801 | 3/1961 | Dirks. | |
| 3,099,711 | 7/1963 | Foley et al. | 197—1 XR |
| 3,112,693 | 12/1963 | Williams | 197—1 XR |
| 3,190,957 | 6/1965 | Foley et al. | 197—1 XR |

ROBERT E. PULFREY, *Primary Examiner.*

E. S. BURR, *Assistant Examiner.*